United States Patent
Fujinaka et al.

(10) Patent No.: US 10,036,332 B2
(45) Date of Patent: Jul. 31, 2018

(54) VALVE DEVICE

(71) Applicant: DENSO CORPORATION, Kariya, Aichi-pref. (JP)

(72) Inventors: Yuuta Fujinaka, Kariya (JP); Takashi Kobayashi, Kariya (JP); Kazushi Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/523,816

(22) PCT Filed: Nov. 16, 2015

(86) PCT No.: PCT/JP2015/005698
§ 371 (c)(1),
(2) Date: May 2, 2017

(87) PCT Pub. No.: WO2016/079975
PCT Pub. Date: May 26, 2016

(65) Prior Publication Data
US 2017/0321612 A1 Nov. 9, 2017

(30) Foreign Application Priority Data
Nov. 20, 2014 (JP) .................................. 2014-235685

(51) Int. Cl.
| *F16K 1/22* | (2006.01) |
| *F02D 9/02* | (2006.01) |
| *F16K 31/04* | (2006.01) |
| *F02D 9/04* | (2006.01) |
| *F02M 35/10* | (2006.01) |
| *F02D 41/14* | (2006.01) |

(52) U.S. Cl.
CPC .................. *F02D 9/02* (2013.01); *F02D 9/04* (2013.01); *F02D 41/1493* (2013.01); *F02M 35/10393* (2013.01); *F16K 1/22* (2013.01); *F16K 31/041* (2013.01); *F02D 2009/0213* (2013.01)

(58) Field of Classification Search
CPC .......... F02D 9/02; F02D 9/04; F02D 41/1493; F02D 2009/0213; F02M 35/10393; F16K 1/22; F16K 31/041
USPC ........................................ 251/129.11, 129.04
See application file for complete search history.

(56) References Cited

U.S. PATENT DOCUMENTS

| 5,429,090 A * | 7/1995 | Kotchi .................... F02D 9/02 123/396 |
| 6,863,259 B2 * | 3/2005 | Torii ..................... F02D 11/10 251/305 |

(Continued)

*Primary Examiner* — Ian Paquette
(74) *Attorney, Agent, or Firm* — Nixon & Vanderhye PC

(57) ABSTRACT

An electrically-operated actuator rotates a valve toward its closing side or opening side. A valve urging part urges the valve from a fully-closed position toward the opening side. An ACT control part controls the electrically-operated actuator to drive. A set load of the valve urging part is smaller than a set load that is capable of returning the valve from a fully-closed position to an intermediate position only by urging force of the valve urging part. When a position of the valve at time of turning off an IG switch for stopping operation of an internal-combustion engine is on the closing side of the intermediate position, the ACT control part shifts the valve to the intermediate position by the electrically-operated actuator after the IG switch is turned off.

2 Claims, 8 Drawing Sheets

(56) References Cited

U.S. PATENT DOCUMENTS

| | | | | |
|---|---|---|---|---|
| 6,932,051 B2 * | 8/2005 | Soshino | ............... | F02D 9/1045 123/337 |
| 2005/0183705 A1 * | 8/2005 | Nanba | ................... | F02D 9/1045 123/568.24 |
| 2008/0011269 A1 | 1/2008 | Tanimura et al. | | |

* cited by examiner

VALVE DEVICE

CROSS REFERENCE TO RELATED APPLICATION

This application the U.S. national phase of International Application No. PCT/JP2015/005698 filed 16 Nov. 2015, which designated the U.S. and claims priority to Japanese Patent Application No. 2014-235685 filed on Nov. 20, 2014, the entire contents of each of which are incorporated herein by reference.

TECHNICAL FIELD

The present disclosure relates to a valve device to open and close a fluid flow path communicating with a combustion chamber in an internal-combustion engine.

BACKGROUND ART

A valve device having a body forming a fluid flow path communicating with a combustion chamber in an internal-combustion engine and a valve supported pivotably in the body and driven by an actuator has been conventionally known. As such a valve device, a throttle valve device that can change an intake air mass fed to a combustion chamber, an EGR valve device that can change an exhaust gas mass recirculated from an exhaust path to an intake path, or the like is named.

Then as a valve device, a valve device of a W spring structure having a spring loading an open side urging force on a valve (hereunder referred to as an opening spring) and a spring loading a closed side urging force on a valve (hereunder referred to as a closing spring) is named (refer to Patent Document 1 for example).

In such a valve device, the urging force of an opening spring is added to a valve shaft when a valve is on the closed side of a predetermined intermediate position (a predetermined valve position set between a fully-closed position and a fully-open position) and the urging force of a closing spring is added to the valve shaft when the valve is located on the open side of the intermediate position. Then the valve device is structured so that the valve may stay at the intermediate position by the urging force of a spring in the state where the driving force of an actuator is zero (with regard to the detail of the structure, refer to Patent Document 1 for example).

More specifically, as illustrated in FIG. 10, a valve returns to an intermediate position only by a torque generated by the urging force of a closing spring when the driving force of an actuator is released in the region where the urging force of the closing spring is loaded (refer to the alternate long and two short dashes line with the arrow directed from a fully-open position toward the intermediate position in FIG. 10). Further, a valve returns to the intermediate position only by a torque generated by the urging force of an opening spring when the driving force of the actuator is released in the region where the urging force of the opening spring is loaded (refer to the alternate long and two short dashes line with the arrow directed from a fully-closed position toward the intermediate position in FIG. 10).

Here, in FIG. 10, the side of a rotary torque directed to the open side of a position where a load torque around a valve shaft is zero is represented by a positive side (upper side in the vertical axis) and the side of a rotary torque directed to the closed side is represented by a negative side (lower side in the vertical axis). In the present description, regardless of a positive side or a negative side, the magnitude of an absolute value is explained as the magnitude of a torque in a direction.

When a valve returns to an intermediate position by the release of the driving force of an actuator, a resistance force (frictional force and motor detent torque) is loaded on a valve shaft in the direction of restraining the valve from returning to the intermediate position by the urging force of a spring. As a result, the valve returns to the intermediate position by a torque generated by subtracting the resistance force from the urging force of the spring.

In this way, the set load of each of an opening spring and a closing spring is set at such a set load as to be able to return to an intermediate position only by an own urging force even when a resistance force exists. That is, the position where a valve can return from both an open side and a closed side unaidedly without the driving force of an actuator (self-return position) is an intermediate position.

In a valve device of such a structure, a torque exceeding the urging force of a closing spring and a resistance force (frictional force and the like) of hindering the rotation of a valve is required to be loaded by an actuator in order to move the valve from an intermediate position to an open side (refer to the thick solid line with the arrow directed from the intermediate position toward the fully-open position in FIG. 10). Further, a torque exceeding the urging force of an opening spring and a resistance force is required to be loaded by an actuator in order to move the valve from an intermediate position to a closed side (refer to the thick solid line with the arrow directed from the intermediate position toward the fully-closed position in FIG. 10).

Then an electric power supplied to an actuator increases as a required torque increases. In other words, an electric power supplied to an actuator increases as the urging force of a spring and a resistance force increase. In the case of a valve device that has to maintain a valve at a fully-closed position for a long period of time in particular, an actuator may burn out disadvantageously if the urging force of an opening spring and a resistance force are large. This is because a fully-closed position maintaining required torque necessary for maintaining a valve at a fully-closed position increases. For the reason, there is a need for reducing the urging force of an opening spring and restraining the burnout of an actuator.

When the urging force of an opening spring is reduced however, a valve cannot return to a predetermined intermediate position only by the urging force of the opening spring and stops disadvantageously at a position on the closed side of the intermediate position.

When an intermediate position is set as a position allowing a valve to be restrained from freezing and sticking, the valve may freeze and stick disadvantageously if the valve can return only to a position on the closed side of the intermediate position. Here, the freezing and sticking of a valve means the phenomenon of the valve being immovable because moisture included in an intake gas or an exhaust gas in a fluid flow path condenses under a low temperature environment after an IG switch (ignition switch) is turned off and the moisture freezes between the valve and a body.

For the reason, the situation of stopping a valve at a position on the closed side of an intermediate position after an IG switch is turned off is required to be avoided to the utmost extent. In other words, a valve is required to return to an intermediate position without fail after an IG switch is turned off even when the valve is located on the closed side of the intermediate position at the time of commanding the IG switch to turn off.

Consequently, there is a request for locating a valve position after an IG switch is turned off at an intermediate position to the utmost extent in addition to a request for restraining the burnout of an actuator and a structure capable of materializing both the requests is needed.

PRIOR ART DOCUMENT

Patent Document

Patent Document 1: JP2008-19825A

SUMMARY OF INVENTION

The present disclosure addresses the above issues. Thus, it is an objective of the present disclosure to fulfill both the request for restraining the burnout of an actuator and the request for locating a valve position after an IG switch is turned off at an intermediate position to the utmost extent in a valve device.

To achieve the objective, a valve device in an aspect of the present disclosure includes a body, a valve, an electrically-operated actuator, a valve urging part, and an ACT control part. The body defines a fluid flow path communicating with a combustion chamber of an internal-combustion engine. The valve is accommodated rotatably in the fluid flow path to vary an opening degree of the fluid flow path, and includes a fully-open position that is a valve position at which a flow path area of the fluid flow path is maximized, a fully-closed position that is a valve position at which the flow path area of the fluid flow path is minimized, and an intermediate position that is a predetermined valve position between the fully-open position and the fully-closed position. The electrically-operated actuator rotates the valve toward its closing side or opening side. The valve urging part urges the valve from the fully-closed position toward the opening side. The ACT control part controls the electrically-operated actuator to drive.

A set load of the valve urging part is smaller than a set load that is capable of returning the valve from the fully-closed position to the intermediate position only by urging force of the valve urging part. When a position of the valve at time of turning off an IG switch for stopping operation of the internal-combustion engine is on the closing side of the intermediate position, the ACT control part shifts the valve to the intermediate position by the electrically-operated actuator after the IG switch is turned off.

As a result, it is possible to: reduce a set load of a valve urging part so as to be smaller than before; and hence reduce an electric power supplied to an electric actuator necessary for maintaining a valve at a fully-closed position. The burnout of the electric actuator can therefore be restrained. In contradiction however, the present aspect is structured so that a valve cannot return to an intermediate position only with a valve urging part. The present aspect is therefore configured so as to shift a valve to an intermediate position by an electric actuator after an IG switch is turned off.

As a result, in the present aspect, it is possible to fulfill both the request for restraining the burnout of an actuator and the request for locating a valve position after an IG switch is turned off at an intermediate position to the utmost extent.

BRIEF DESCRIPTION OF DRAWINGS

The above and other objects, features and advantages of the present disclosure will become more apparent from the following detailed description made with reference to the accompanying drawings. In the drawings.

EMBODIMENT FOR CARRYING OUT INVENTION

Figure 1:
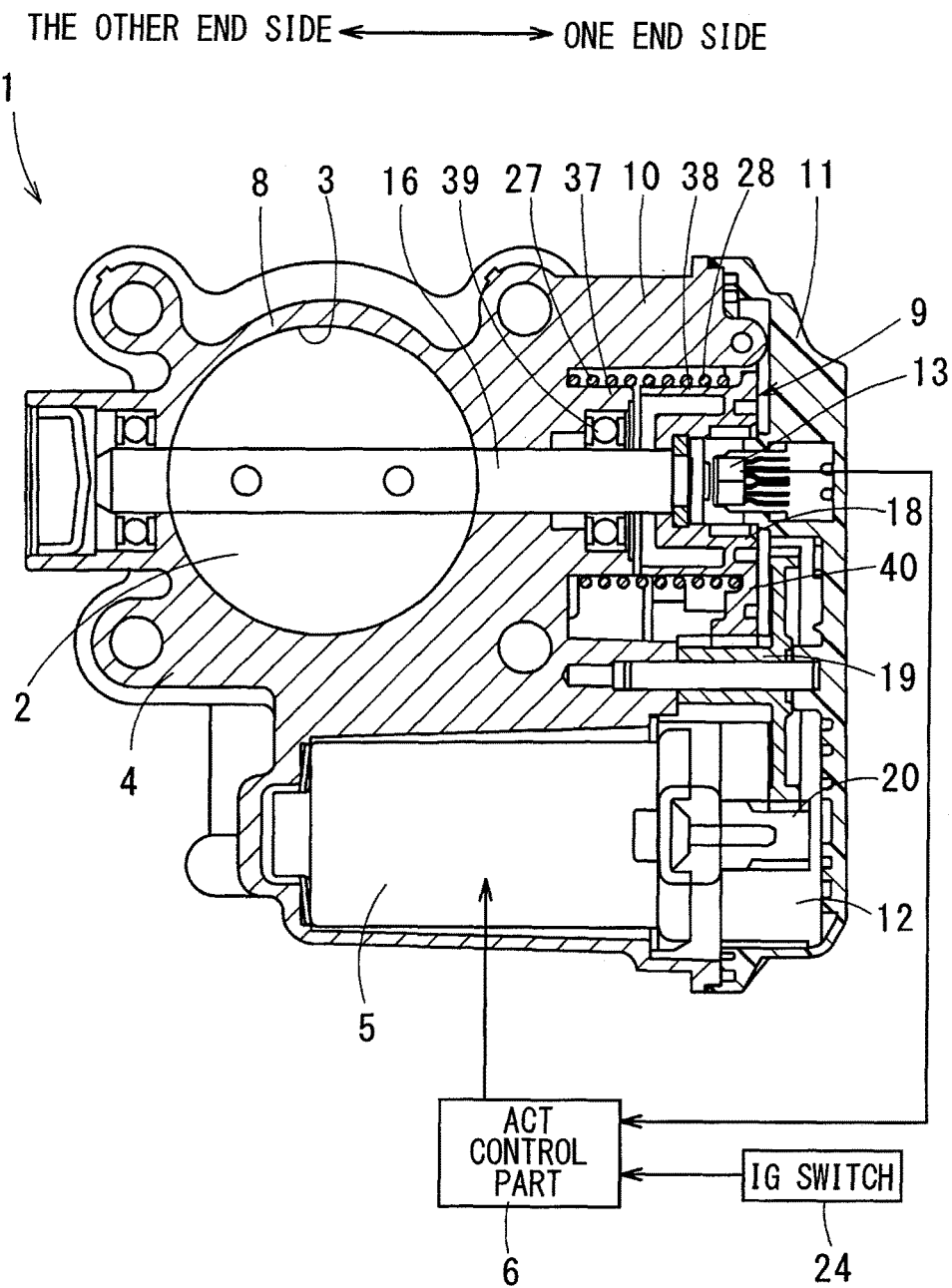
FIG. 1 is a sectional view illustrating an overall configuration of a valve device (embodiment)
Figure 2:
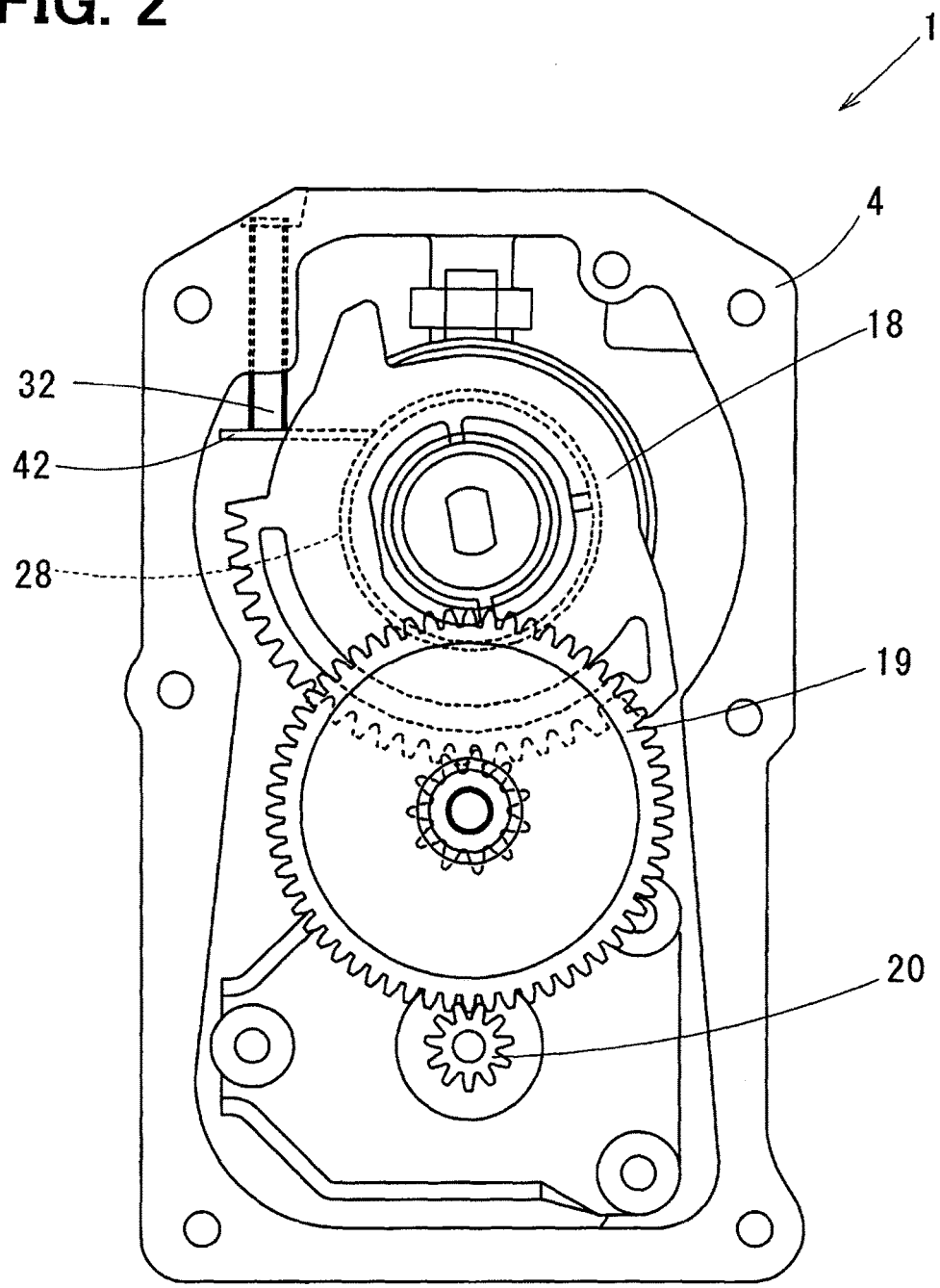
FIG. 2 is a view illustrating an internal structure of a valve device in the state of removing a housing cover (embodiment)
Figure 3:
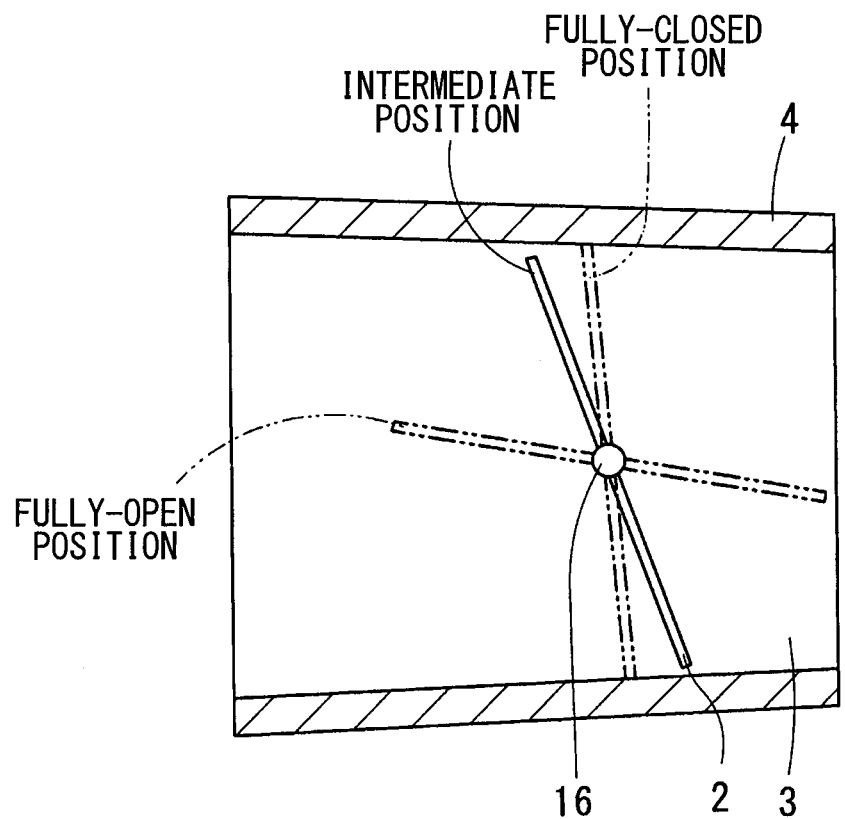
FIG. 3 is an explanatory view explaining an intermediate position of a valve (embodiment)

The present disclosure is explained in detail by the following embodiment.

The configuration of an embodiment is described hereunder. A valve device 1 according to the present embodiment is explained in reference to FIGS. 1 to 9. The valve device 1 according to the present embodiment is a throttle valve device for a diesel engine and is a valve device for adjusting an intake air mass fed to a combustion chamber in an internal-combustion engine.

The valve device 1 has: a valve 2 of a butterfly valve type driven in response to an accelerator manipulative variable by a driver; a body 4 forming an intake path 3 to an internal-combustion engine and containing the valve 2; a motor 5 to drive the valve 2; and an ACT control part 6 to control the drive of the motor 5.

The body 4 is made of a metal and has a cylinder part 8 forming the intake path 3 and containing the valve 2 and a gear housing part 10 containing a reduction gear 9 to transfer the driving force of the motor 5 to the valve 2.

Then, a resin-made housing cover 11 is bonded to an open-end face of the gear housing part 10 and a gear box 12 containing the reduction gear 9 is formed between the housing cover 11 and the gear housing part 10. Further, a position sensor 13 to detect an opening angle of the valve 2 (valve position) is contained in the gear box 12.

The valve 2 is a butterfly valve fixed to a valve shaft 16 and formed into a disc-like shape with a metallic material or a resin material. The valve shaft 16 is made of a metallic material and is rotatably supported by the body 4 with the shaft extending in a radial direction of the cylinder part 8.

The motor 5 is an electrically-operated actuator that can reciprocally rotate the valve shaft 16 when electricity is applied. The reduction gear 9: reduces a rotation speed of the motor 5 to a predetermined rotation speed of the valve shaft 16; has a valve gear 18 fixed to the valve shaft 16, an intermediate gear 19 engaging with the valve gear 18 and rotating, and a pinion gear 20 fixed to an output shaft of the motor 5; and rotatably drives the valve 2.

One end (end farther from the valve 2) of the valve shaft 16 protrudes into the gear box 12 and the valve gear 18 is fixed to the one end of the valve shaft 16. That is, the valve gear 18 rotates by receiving a driving force from the motor 5 and thus the valve gear 18, the valve shaft 16, and the valve 2 rotate integrally.

The body 4 has a fully-open stopper (not shown in the figures) abutting the valve gear 18 and regulating a movement limit position of the valve shaft 16 on the open side and a fully-closed stopper 22 (refer to FIG. 6) abutting the valve gear 18 and regulating a movement limit position of the valve shaft 16 on the closed side and thus the movable range of the valve 2 is determined by the stoppers.

The motor 5 is controlled electrically by the ACT control part 6. In the present embodiment, an engine control unit (ECU) functions as the ACT control part 6. The ACT control part 6 electrically controls the motor 5 by receiving an input from an IG switch 24, the position sensor 13, and others.

Further, the valve device 1 has a closing spring 27, an opening spring (valve urging part) 28, spring seats 30, 31, and 32 of the springs, and an opener 33.

The closing spring 27 gives an urging force on the closed side to the valve 2. That is, an urging force is urged on the valve 2 in the direction of moving the valve 2 from a fully-open position toward the closed side. The opening spring 28 gives an urging force on the open side to the valve 2. That is, an urging force is urged on the valve 2 in the direction of moving the valve 2 from a fully-closed position toward the open side.

Here, the fully-open position is a valve position where a flow path area takes a maximum value and the fully-closed position is a valve position where the flow path area takes a minimum value in the range where the valve 2 is movable. Further, in the valve device 1, a predetermined valve position between the fully-closed position and the fully-open position is set as an intermediate position (refer to FIG. 3).

In the present embodiment, the intermediate position is set as a valve position capable of avoiding freezing and sticking between a valve and a body caused by condensing moisture included in an intake gas under a low-temperature environment.

The closing spring 27 and the opening spring 28 are torsion springs respectively. The closing spring 27 and the opening spring 28 are arranged coaxially around the outer periphery of the valve shaft 16 respectively. The opening spring 28 and then the closing spring 27 are arranged in sequence from the one end (end farther from the valve 2) of the valve shaft 16 in the axial direction.

More specifically, the closing spring 27 and the opening spring 28 are arranged around the outer peripheries of a first guide part 37 and a second guide part 38 respectively, those being disposed around the outer periphery of the valve shaft 16. The first guide part 37 is a cylinder part formed in the gear box 12 and disposed in the body 4 so as to arrange a bearing 39 axially supporting the valve shaft 16 in the interior. The second guide part 38 is a cylinder part disposed in the valve gear 18. The cylinder part protrudes toward the other end of a gear part 40 where gear teeth of the valve gear 18 are formed in the axial direction and surrounds the valve shaft 16.

The one end of the closing spring 27 and the other end of the opening spring 28 join together and form a U-shaped joint part 42. The joint part 42 is bent toward the outer periphery and protrudes outward in a radial direction (refer to FIG. 4). Here, although the joint part 42 is arranged between the closing spring 27 and the opening spring 28 in the present embodiment, the closing spring 27 and the opening spring 28 are not limited to be configured to have the joint part 42. For example, the closing spring 27 and the opening spring 28 may be formed separately and configured so that the respective ends may be pressed by the opener 33 which will be described later.

Figure 4:
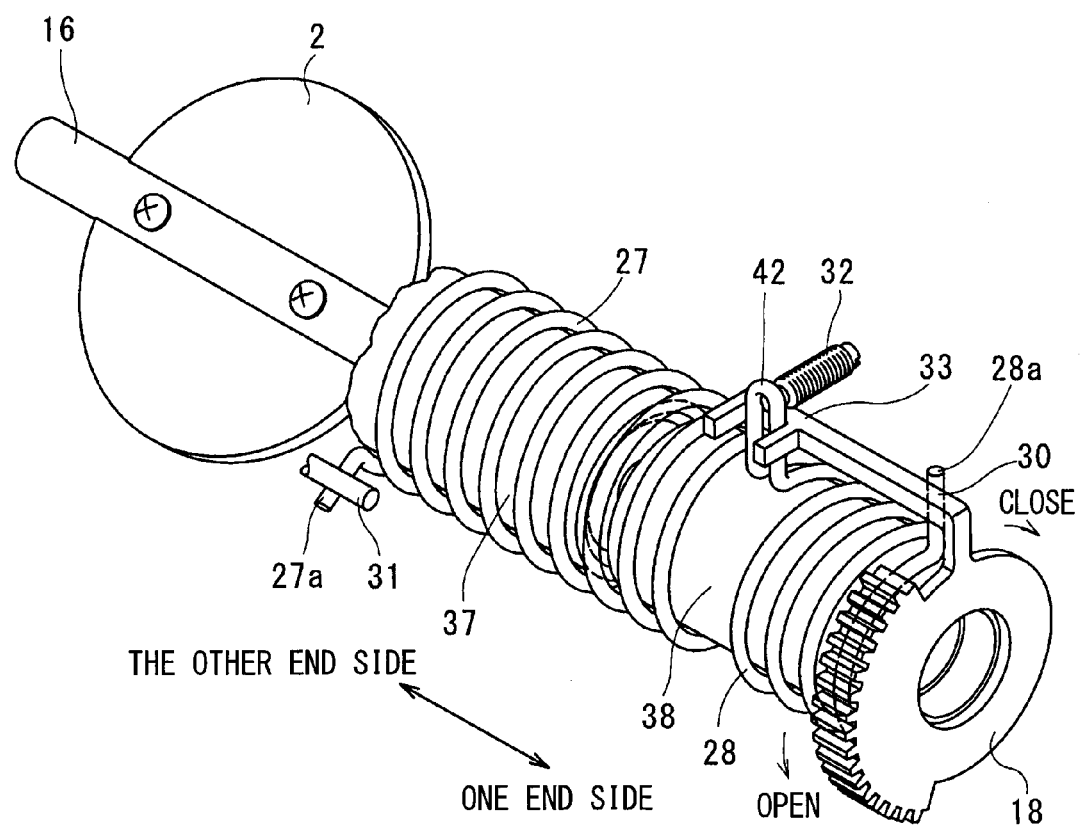
FIG. 4 is a perspective view illustrating a spring support structure of a valve device (embodiment)

The spring seat 30 is disposed in the valve gear 18 and locks one end 28a of the opening spring 28 (refer to FIG. 4). The spring seat 31 is disposed in the body 4 and locks the other end 27a of the closing spring 27 (refer to FIG. 4).

The spring seat 32 is disposed in the body 4 and locks the joint part 42 when the valve 2 is located on the closed side of the intermediate position. Then the joint part 42 is locked by the opener 33 that will be described later when the valve 2 is located on the open side of the intermediate position. The joint part 42 is in the state of being locked by both the spring seat 32 (hereunder referred to as an intermediate stopper 32) and the opener 33 at the intermediate position.

The opener 33 is disposed in the valve gear 18 and rotates the valve 2 toward the open side of the intermediate position against the urging force of the closing spring 27. The opener 33: is disposed so as to rotate integrally with the valve gear 18; is locked to the joint part 42 on the open side of the intermediate position; presses the joint part 42 against the urging force of the closing spring 27 in accordance with the rotation of the valve gear 18; and drives the valve 2 toward the opening direction.

The drive of the valve 2 is described hereunder. When the valve 2 moves from the intermediate position to the fully-open position, the driving force of the motor 5 is transferred to the valve gear 18. As a result, the valve gear 18 and the valve 2 rotate. On this occasion, the opener 33 presses the joint part 42 against the urging force of the closing spring 27. During the time, the urging force of the opening spring 28 is not involved with the valve 2. The reason is that the one end 28a of the opening spring 28 is locked to the spring seat 30 of the valve gear 18, the other end (joint part 42) of the opening spring 28 is still locked to the opener 33, no relative rotation is generated during the time, and the opening spring 28 is not twisted.

When the valve 2 moves from the intermediate position to the fully-closed position, the driving force of the motor 5 is transferred to the valve gear 18. As a result, the valve gear 18 and the valve 2 rotate. On this occasion, the valve gear 18 rotates on the closed side while the joint part 42 is still locked to the intermediate stopper 32, hence the opening spring 28 is twisted, and the urging force of the opening spring 28 acts on the valve shaft 16. Here, the opener 33 rotates toward the closed side integrally with the valve gear 18 and hence separates from the joint part 42. During the time, the urging force of the closing spring 27 is not involved with the valve 2. The reason is that both the other end 27a and the one end (joint part 42) of the closing spring 27 are in the state of being locked to the body 4 and the closing spring 27 is not twisted.

In the present embodiment, by controlling the supply of electricity by the ACT control part 6, it is possible to maintain the valve 2 at the fully-closed position or the fully-open position in addition to rotate the valve 2.

Features of the present embodiment are explained in reference to FIGS. 5 to 9. A valve device according to the present embodiment has the following two features: (1) a set load of an opening spring 28 is smaller than a set load capable of returning from a fully-closed position to an intermediate position only by an urging force of the opening spring 28; and (2) an ACT control part 6, when a valve position is on the closed side of an intermediate position at the time of turning off an IG switch 24 to stop operating an internal-combustion engine, shifts a valve 2 to the intermediate position by a motor 5 after the IG switch 24 is turned off.

Figure 10:
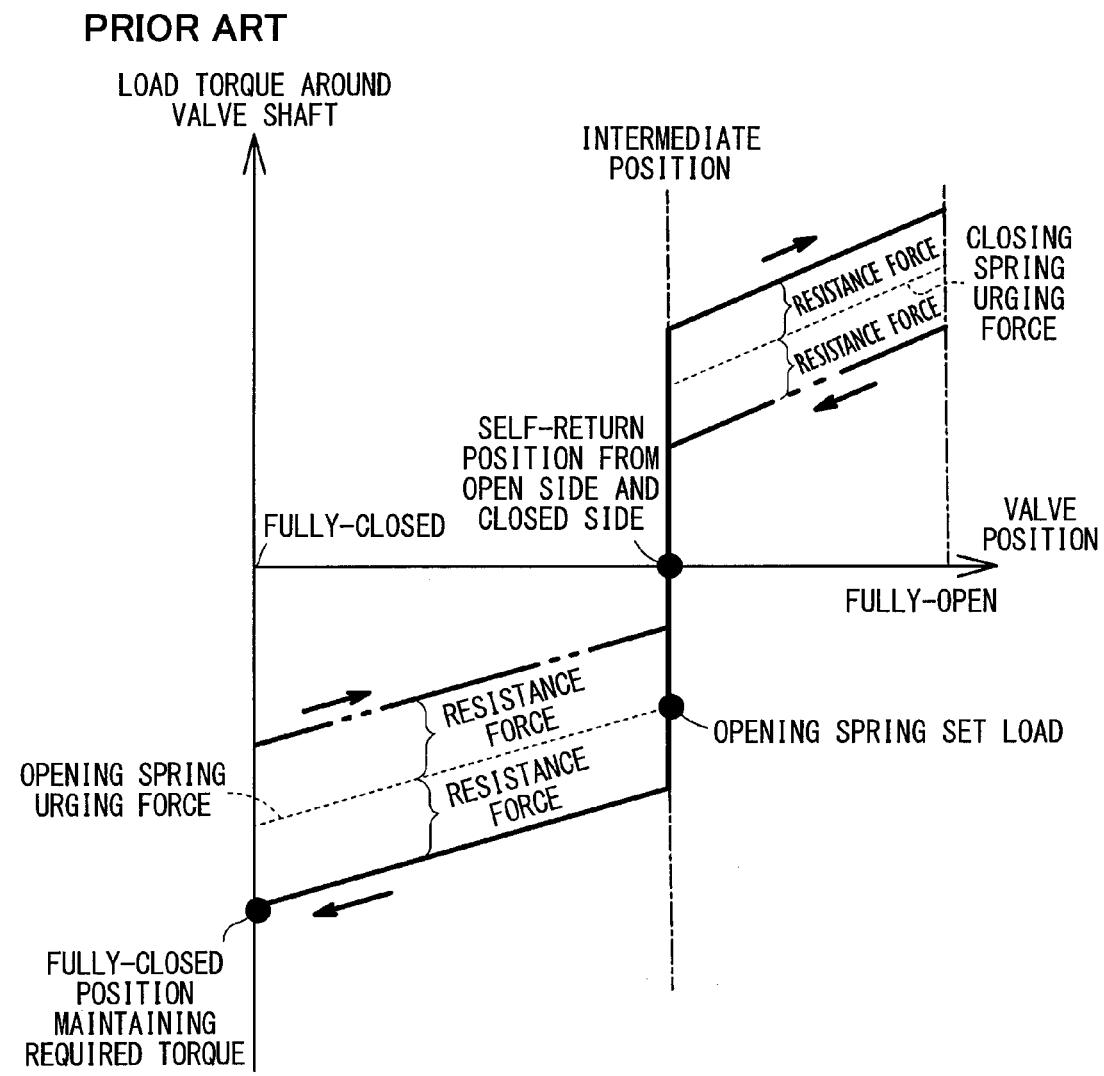
FIG. 10 is a correlation diagram illustrating a correlation between a valve position and a load torque around a valve shaft (conventional example).

Firstly, the feature (1) is explained. When a valve 2 returns to an intermediate position by springs 27 and 28 as a result of the release of the driving force of a motor 5, a resistance force (frictional force and motor detent torque) is loaded on a valve shaft 16 in the direction of restraining the valve 2 from returning to the intermediate position by the urging forces of the springs 27 and 28. As a result, the set loads of the opening spring 28 and the closing spring 27 are generally set at set loads allowing the valve 2 to return to the intermediate position only by the torques generated by the own urging forces respectively even when a resistance force exists (refer to FIG. 10).

More specifically, when the driving force of a motor 5 is released from the state where an opener 33 presses a joint part 42 and a valve 2 rotates to the open side of an intermediate position by the driving force of the motor 5, the joint part 42 returns to the intermediate position where the joint part 42 abuts an intermediate stopper 32 by the torque generated by the urging force of a closing spring 27. Further, when the driving force of the motor 5 is released from the state where a valve gear 18 rotates to the closed side of the intermediate position by the driving force of the motor 5 while the joint part 42 is locked to the intermediate stopper 32, the opener 33 returns to the intermediate position where the opener 33 abuts the joint part 42 by the torque generated by the urging force of an opening spring 28.

In the present embodiment however, the urging force of an opening spring 28: is smaller than before; cannot overcome a resistance force only by the urging force of the opening spring 28; and is to the extent of not allowing a valve to return from a fully-closed position to an intermediate position.

Figure 5:
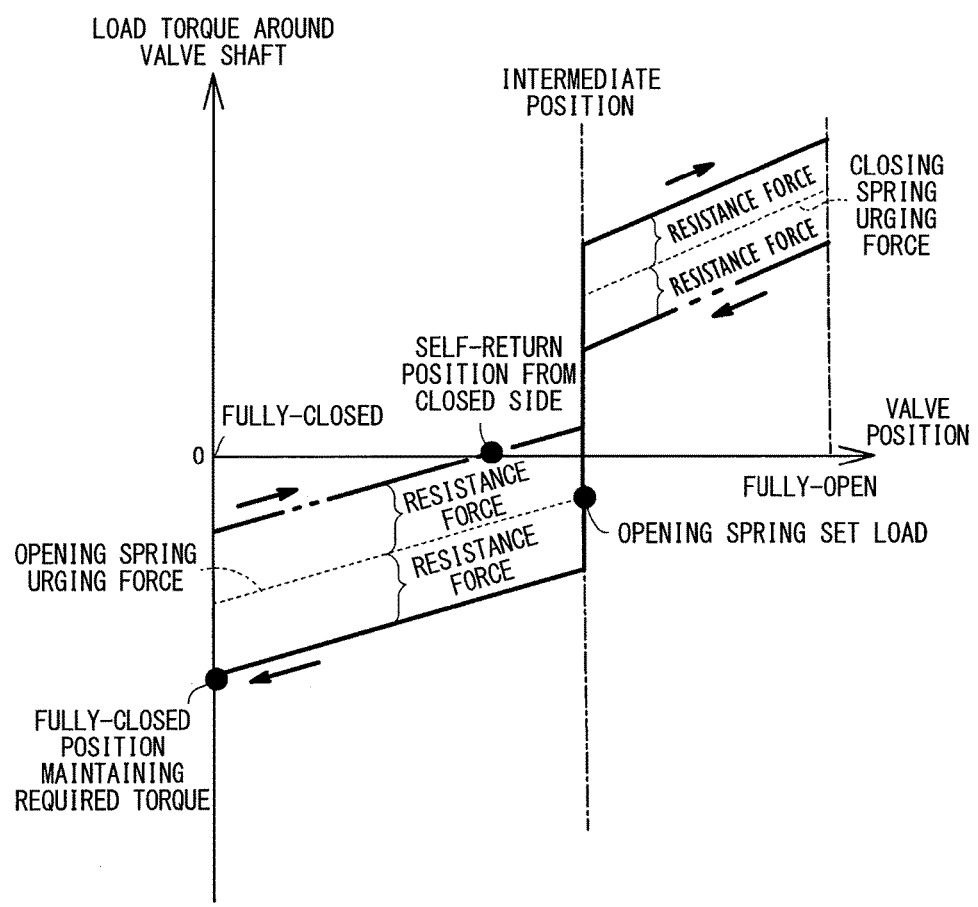
FIG. 5 is a correlation diagram illustrating a correlation between a valve position and a load torque around a valve shaft (embodiment)

As illustrated in FIG. 5, although the urging force of an opening spring 28 is loaded on a valve shaft 16 from a fully-closed position to an intermediate position, a resistance force is generated when a valve 2 is prompted to return toward the direction of the intermediate position by the urging force of the opening spring 28 and hence a torque obtained by subtracting the resistance force from the urging force of the opening spring 28 comes to be a torque that is generated by the opening spring 28 and prompts the valve 2 to return to the open side (refer to the alternate long and two short dashes line with the arrow directed from the fully-closed position toward the intermediate position in FIG. 5). In the present embodiment, the set load of the opening spring 28 is set so that the valve 2 may not be able to return to the intermediate position by the torque. That is, the set load of the opening spring 28 is set so that an opening spring set load may be smaller than a resistance force in returning from the fully-closed position to the intermediate position.

For the reason, as illustrated in FIG. 5, when the valve 2 is directed from the fully-closed position to the open side by a torque being generated by the opening spring 28 and prompting the valve 2 to return to the open side, a load torque around a valve shaft comes to be zero before the valve 2 reaches the intermediate position and the valve 2 cannot return to the intermediate position. That is, a position capable of returning from the fully-closed position on one's own (self-return position) without a driving force of a motor 5 comes to be located on the closed side of the intermediate position.

Here in FIG. 5, the side of a rotary torque directed to the open side of a position where a load torque around a valve shaft is zero (self-return position) is represented by a positive side (upper side in the vertical axis) and the side of a rotary torque directed to the closed side of the self-return position is represented by a negative side (lower side in the vertical axis). In the present description, regardless of a positive side or a negative side, the magnitude of an absolute value is explained as the magnitude of a torque in a direction.

Figure 6:
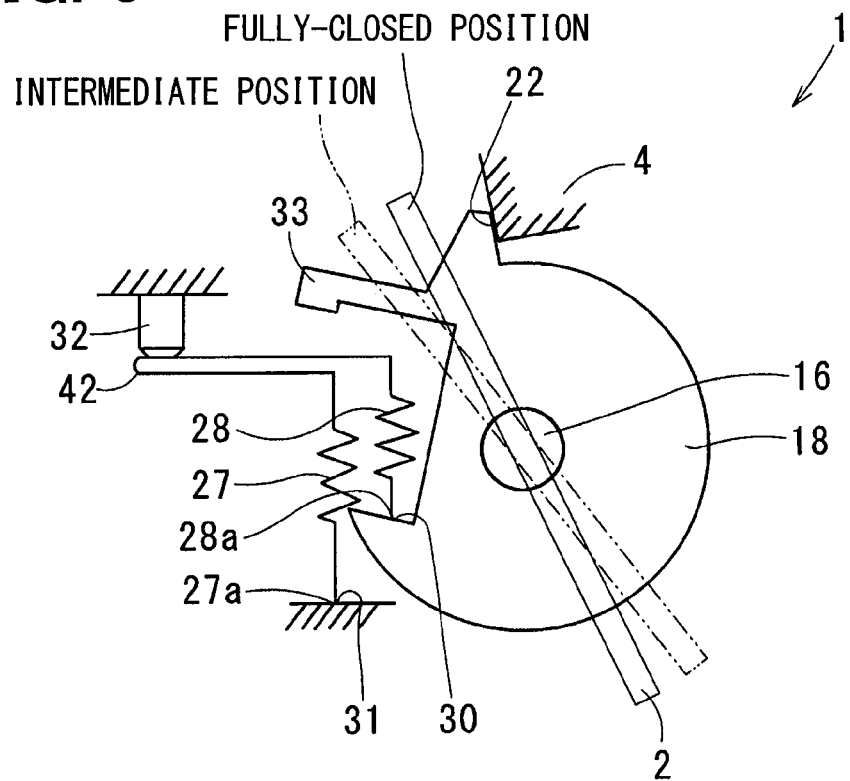
FIG. 6 is a schematic view of a valve device (embodiment)
Figure 7:
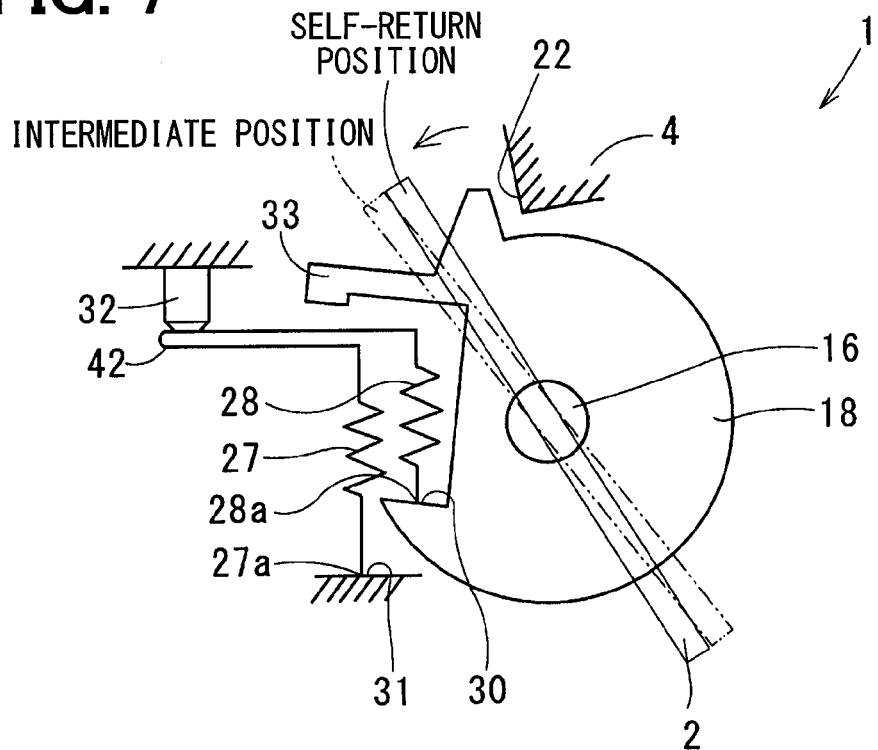
FIG. 7 is a schematic view of a valve device (embodiment)
Figure 8:
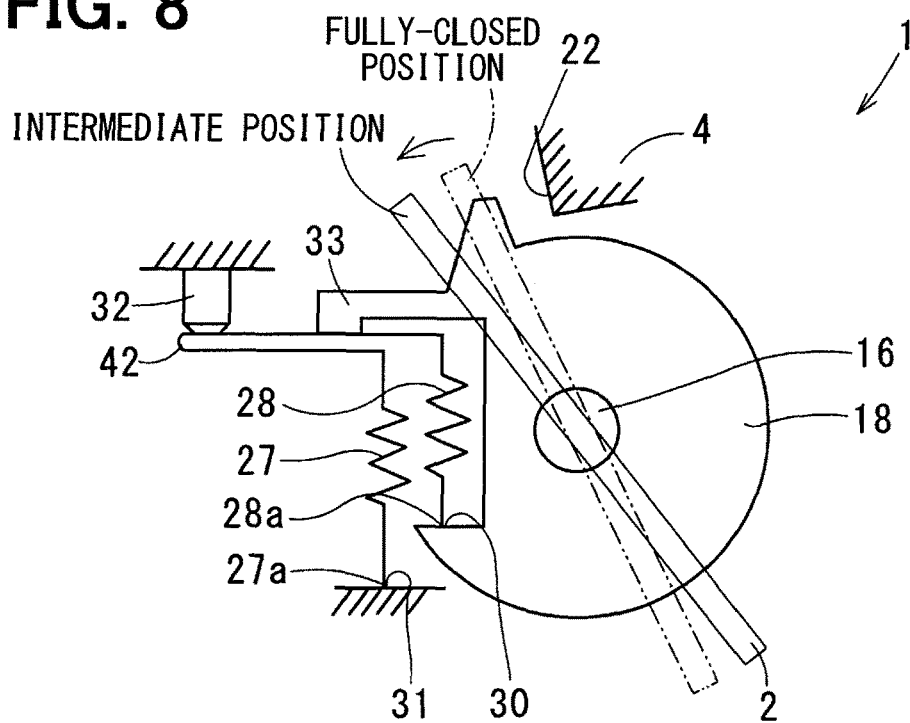
FIG. 8 is a schematic view of a valve device (embodiment)

The above situation is explained in reference to the movement of an actual valve 2. Each of FIGS. 6 to 8 is a schematic view illustrating a spring structure around a valve shaft in a valve device 1. FIG. 6 illustrates the state where a torque not smaller than a fully-closed position maintaining required torque is loaded by a motor 5 and a valve 2 is located at a fully-closed position. On this occasion, since the valve device 1 is in the state where a joint part 42 is locked to an intermediate stopper 32 and one end 28a of an opening spring 28 rotates together with a valve gear 18, the opening spring 28 is twisted and an urging force toward the open side is generated. Here, a fully-closed position maintaining required torque is a torque required for maintaining a valve 2 at a fully-closed position and is determined by the urging force of an opening spring 28 and a resistance force.

FIG. 7 illustrates a state in the case of releasing the driving force of the motor 5 from the state of FIG. 6. The valve 2 moves along the alternate long and two short dashes line with the arrow directed from the fully-closed position toward the intermediate position in FIG. 5. A load torque around the valve shaft however comes to be zero before the valve 2 reaches the intermediate position. In other words, the valve 2 stops at a position (self-return position) on the closed side of the intermediate position.

Successively, the feature (2) is explained. The purpose of the feature (2) is to compensate the event generated in the feature (1). More specifically, the purpose is to prompt a valve 2 to return to an intermediate position by a motor 5 because the valve 2 cannot return to the intermediate position only by a torque generated by the urging force of an opening spring 28.

Figure 9:
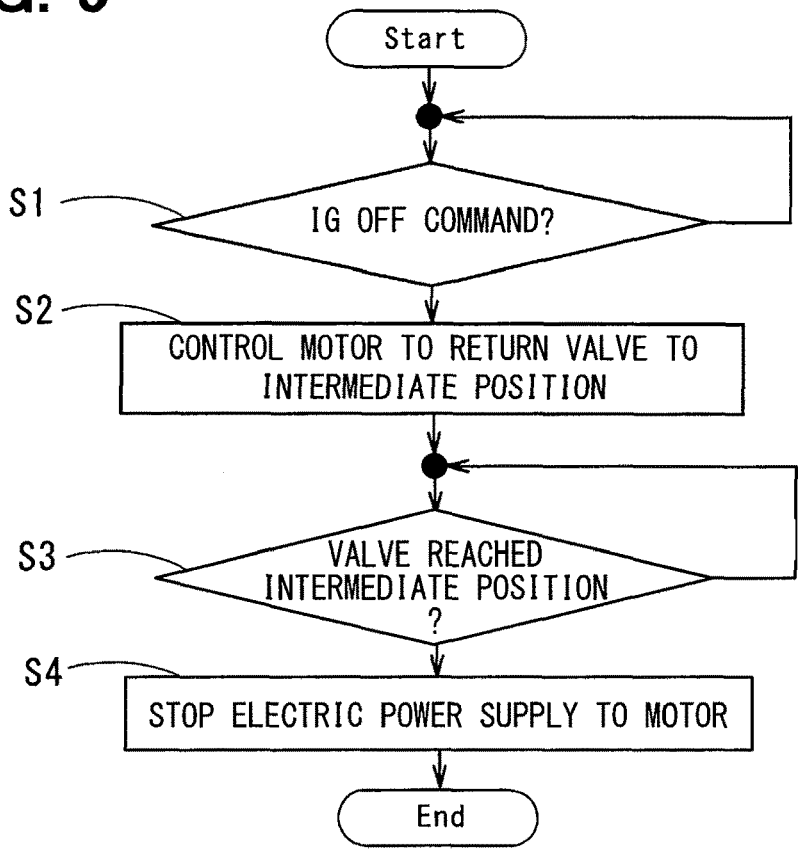
FIG. 9 is a control flowchart of a valve device (embodiment)

A concrete control flow is explained in reference to FIG. 9. Firstly, at S1, whether or not an IG switch is turned off is determined. When the determination is YES, the flow advances to S2, a valve position at the time is confirmed, and a valve 2 moves to an intermediate position by controlling the motor 5 when the valve position is on the closed side of the intermediate position.

Then the flow advances to S3, whether or not the valve 2 has reached the intermediate position is checked, and, when the valve 2 has reached the intermediate position, the flow advances to S4 and electric power supply to the motor 5 is stopped.

For example, when the IG switch 24 is turned off, the valve 2 is regarded as located at the fully-closed position as illustrated in FIG. 6. On this occasion, even after the IG switch 24 is turned off, the electric power supply to the motor 5 is continued and the valve 2 is driven to the intermediate position by the motor 5 (refer to FIG. 8). Successively the electric power supply to the motor 5 is stopped.

Further, after the electric power supply to the motor 5 is stopped, at the intermediate position, the valve 2 is in the state of stopping at the intermediate position by the balance between the urging force of the closing spring 27 and a resistance force.

Operation and effect of the present embodiment are described hereunder. In the present embodiment, the set load of an opening spring 28 is smaller than a set load allowing a valve 2 to return from a fully-closed position to an intermediate position only by the urging force of the opening spring 28. In order to move a valve 2 from an intermediate position to the closed side, a torque exceeding the urging force of an opening spring 28 and a resistance force has to be loaded by a motor 5 (refer to the solid line with the arrow directed from the intermediate position to the fully-closed position in FIG. 5).

An electric power supplied to a motor 5 increases as a required torque increases. In other words, an electric power supplied to a motor 5 increases as the urging force of an opening spring and a resistance force increase. In the case of a valve device 1 that has to maintain a valve 2 at a fully-closed position for a long period of time in particular, a motor 5 may burn out disadvantageously if the urging force of an opening spring 28 and a resistance force are large.

In the present embodiment, since the urging force of an opening spring 28 can be smaller than before, a torque required for maintaining a valve 2 at a fully-closed position (fully-closed position maintaining required torque) reduces. As a result, the burnout of a motor 5 can be restrained.

Further, an ACT control part 6, when a valve position at the time of turning off an IG switch 24 is located on the closed side of an intermediate position, shifts a valve 2 to the intermediate position by a motor 5 after the IG switch 24 is turned off.

As a result, even when the urging force of an opening spring 28 reduces, a valve position in the state of turning off an IG switch 24 can be located at an intermediate position without fail.

When an intermediate position is set as a valve position capable of avoiding freezing and sticking between a valve 2 and a body 4 in particular, the freezing and sticking can be restrained without fail by locating a valve position in the state of turning off an IG switch 24 at the intermediate position without fail.

In this way, according to the present embodiment, it is possible to fulfill both the request for restraining the burnout of a motor 5 by reducing the urging force of an opening spring 28 and the request for locating a valve position after an IG switch 24 is turned off at an intermediate position to the utmost extent.

Even if a valve position at the time of turning off an IG switch 24 is located on the closed side of an intermediate position and an abnormal situation of being unable to drive a motor 5 after the IG switch 24 is turned off arises by any chance, a valve 2 returns to a self-return position that is a predetermined valve position between a fully-closed position and the intermediate position and hence at least a state of being capable of evacuation travelling is obtained.

Further, in the present embodiment, a valve 2 receives an urging force to the closed side by a closing spring 27 and the urging force of the closing spring 27 is set at a value allowing the valve 2 to return from a fully-open position to an intermediate position when the driving force of a motor 5 is released. As a result, when a valve position at the time of turning off an IG switch 24 is located on the open side of the intermediate position, the electric power supply to a motor 5 may be stopped at the same time as the IG switch 24 is turned off.

Modifications of the above embodiment are explained hereunder. Although both a closing spring 27 and an opening spring 28 are provided in the present embodiment, a structure having only an opening spring 28 may also be adopted.

Further, although a valve device 1 is a throttle valve device in the present embodiment, the disclosure is not limited to the embodiment and the valve device 1 may also be an EGR valve device allowing the volume of an exhaust gas recirculating from an exhaust path to an intake path to be variable for example.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A valve device comprising:
a body that defines a fluid flow path communicating with a combustion chamber of an internal-combustion engine;
a valve that is accommodated rotatably in the fluid flow path to vary an opening degree of the fluid flow path and that has:
a fully-open position that is a valve position at which a flow path area of the fluid flow path is maximized;
a fully-closed position that is a valve position at which the flow path area of the fluid flow path is minimized; and
an intermediate position that is a predetermined valve position between the fully-open position and the fully-closed position;
an electrically-operated actuator that rotates the valve toward its closing side or opening side;
a valve urging part that urges the valve from the fully-closed position toward the opening side; and
an ACT control part that controls the electrically-operated actuator to drive, wherein:
a set load of the valve urging part is smaller than a set load that is capable of returning the valve from the fully-closed position to the intermediate position only by urging force of the valve urging part; and
when a position of the valve at time of turning off an IG switch for stopping operation of the internal-combustion engine is on the closing side of the intermediate position, the ACT control part shifts the valve to the intermediate position by the electrically-operated actuator after the IG switch is turned off.

2. The valve device according to claim 1, wherein:
the fluid flow path is a flow path through which intake gas or exhaust gas from the combustion chamber flows; and
the intermediate position is a position that is set as a valve position capable of avoiding freezing fixation between the valve and the body caused by condensation of moisture contained in intake gas or exhaust gas in the fluid flow path under a low-temperature environment.

* * * * *